Patented Oct. 3, 1933

1,929,328

UNITED STATES PATENT OFFICE 1,929,328

WATER-INSOLUBLE AZO-DYESTUFFS AND FIBER DYED THEREWITH

Fritz Müller, Frankfort-on-the-Main-Nied, Germany

No Drawing. Application April 5, 1933, Serial No. 664,669, and in Germany April 12, 1932

10 Claims. (Cl. 260—95)

The present invention relates to water-insoluble azo-dyestuffs and to fiber dyed therewith; more particularly it relates to compounds of the following general formula:

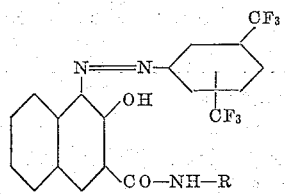

wherein R represents a radical of the benzene or naphthalene series.

U. S. patent application Serial No. 567,132, filed October 5, 1931, in the name of Erwin Hoffa and Fritz Müller, relates to water-insoluble azo-dyestuffs which are obtainable by coupling the diazo-compounds of amino-substitution products of benzotrifluoride and derivatives thereof with 2.3-hydroxynaphthoic acid arylides provided that neither component contains any solubilizing group. The technical value of these new dyestuffs resides in the fact that they yield orange dyeings of fastness properties such as could not be obtained, hitherto, in the preparation of orange dyeings by means of 2.3-hydroxynaphthoic acid arylides.

According to the present invention, there are obtained orange dyeings of a more yellow hue by using as diazo component the diazo compound of such a substitution product of amino-benzotrifluoride (trifluoromethylbenzene) as contains one more or further trifluoromethyl groups and, besides, may be substituted by any substituent, but does not contain any solubilizing group, such as the sulfonic or carboxylic acid group. By introducing one or more trifluoromethyl groups into the nucleus of the benzotrifluoride, the colour scale is extended to such a degree to the yellow side of the spectrum as it has, hitherto, not been possible by means of arylides of 2.3-hydroxynaphthoic acid.

The fastness to light of the dyeings when produced on cotton is in general, but especially in the case of the dyestuffs prepared from 1-amino-3.5-bis-trifluoromethyl benzene, a good one. In the case of the before-mentioned base it lies between grades 6 and 7 of the norms for "Lichtechtheit" of the Echtheitskommission der Fachgruppe für Chemie der Farben- und Textilindustrie im Verein Deutscher Chemiker, 4th edit., 1928 (reprinted in Schultz, Farbstofftabellen, 7th edit., vol. 1, 1931, page XXXI et seq.).

Furthermore, it is noticeable that the new dyestuffs possess a rather high fastness to boiling with water and to washing. Their fastness in this respect lies, in general, between grades 4 and 5 of the norms for "Kochechtheit" of the beforementioned Echtheitskommission (Schultz, Farbstofftabellen, vol. 1, 1931, page XXXII).

The dyestuffs may be produced in substance, on the fiber or on any of the usual substrata adapted for the production of lakes.

The following examples serve to illustrate the invention, but they are not intended to limit it thereto, the parts being by weight unless otherwise stated:

*Dyeing prescription for Examples 1 to 6:*

50 grams of cotton yarn are treated with the grounding liquor for half-an-hour, squeezed, developed for half-an-hour in the diazo-solution; the dyed yarn is rinsed, soaped at boiling temperature, rinsed again and dried.

(1) (a) *Grounding liquor:*

A paste is prepared from

| | | |
|---|---|---|
| 5 | grams | of 2.3-hydroxynaphthoylaminobenzene, |
| 10 | cc. | of Turkey red oil of 50% strength and |
| 7.5 | cc. | of caustic soda solution of 34° Bé., it is dissolved in boiling water and, after cooling, |
| 5 | cc. | of formaldehyde solution of 33% strength are added and the whole is made up to |

1000 cc.;

(b) *Diazo solution:*

| | | |
|---|---|---|
| 2.30 | grams | of 1 - amino - 3.5 - bis - trifluoromethylbenzene are diazotized with |
| 4.5 | cc. | of hydrochloric acid of 20° Bé. and |
| 8 | cc. | of sodium nitrite solution 1:10. The diazo-solution is neutralized with |
| 1 | gram | of sodium bicarbonate and |
| 10 | grams | of sodium acetate and, after addition of |
| 25 | grams | of sodium chloride, the whole is made up to |

1000 cc.,

A vivid, yellowish orange of good fastness properties is obtained.

The dyestuff corresponds to the following formula:

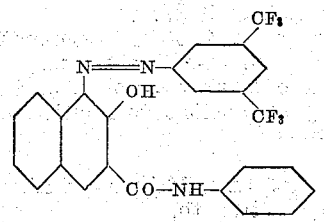

(2) (a) Grounding liquor:
  5 grams of 1-(2'3'-hydroxynaphthoylamino-)3-nitrobenzene,
  10 cc. of Turkey red oil of 50% strength,
  7.5 cc. of caustic soda solution of 34° Bé.,
  1000 cc.;
  5 cc. of formaldehyde solution of 33% strength.

(b) Diazo solution:
The diazo solution is prepared as that described in Example 1. A golden orange is thus obtained.

(3) (a) Grounding liquor:
  5 grams of 1-(2'3'-hydroxynaphthoylamino-)2-methoxybenzene,
  10 cc. of Turkey red oil of 50% strength,
  7.5 cc. of caustic soda solution of 34° Bé.
  1000 cc.;
  5 cc. of formaldehyde solution of 33% strength.

(b) Diazo solution:
The diazo solution is prepared as that described in Example 1. A vivid, yellowish orange is obtained.

(4) (a) Grounding liquor:
  2 grams of 1-(2'3'-hydroxynaphthoylamino-)naphthalene,
  10 cc. of Turkey red oil of 50% strength,
  6 cc. of caustic soda solution of 34° Bé.,
  1000 cc.;
  2 cc. of formaldehyde solution of 33% strength.

(b) Diazo solution:
The diazo solution is prepared as that described in Example 1. A vivid, reddish orange is thus obtained.

(5) (a) Grounding liquor:
  3 grams of 1 - (2'3'-hydroxynaphthoylamino-)2-methyl-4-chlorobenzene,
  10 cc. of Turkey red oil of 50% strength,
  7.5 cc. of caustic soda solution of 34° Bé.,
  1000 cc.;
  3 cc. of formaldehyde solution of 33% strength.

(b) Diazo solution:
The diazo solution is prepared as that described in Example 1. A vivid orange is obtained.

(6) (a) Grounding liquor:
  3 grams of 1-(2'3'-hydroxynaphthoylamino-)4-chlorobenzene,
  10 cc. of Turkey red oil of 50% strength,
  7.5 cc. of caustic soda solution of 34° Bé.;
  1000 cc.;
  3 cc. of formaldehyde solution of 33% strength.

(b) Diazo solution:
The diazo solution is prepared as that described in Example 1. A vivid orange is obtained.

(7) Into a diazo solution, prepared from 22.9 parts of 1-amino-3.5-bis-trifluoromethylbenzene, there is gradually run, while well stirring, a solution prepared by dissolving 26.3 parts of 2.3-hydroxynaphthoylaminobenzene in caustic soda solution, to which there has been added the quantity of sodium acetate necessary for binding the excess of mineral acid. When the formation of the dyestuff is finished, the latter is separated by filtration and washed well. The dyestuff is advantageously used in the form of a paste. In admixture with one of the usual substrata, it yields an orange color lake of very good fastness properties.

The following dyestuffs, among others, are capable of production in accordance with this invention:

| | Diazo compound of | Coupling component | Shade |
|---|---|---|---|
| 1 | 1-amino-2.5-bis-tri-fluoromethylbenzene | 1-(2'3'-hydroxynaphthoylamino-)2-ethoxybenzene | Yellow-orange |
| 2 | 1-amino-2.5-bis-tri-fluoromethylbenzene | 1-(2'3'-hydroxynaphthoylamino-)2-methoxybenzene | Orange |
| 3 | 1-amino-2.5-bis-tri-fluoromethylbenzene | 1-(2'3'-hydroxynaphthoylamino-)4-methoxybenzene | Orange-yellow |
| 4 | 1-amino-2.5-bis-tri-fluoromethylbenzene | 2.3-hydroxynaphthoylaminobenzene | Orange |
| 5 | 1-amino-2.5-bis-tri-fluoromethylbenzene | 1-(2'3'-hydroxynaphthoylamino-)4-chlorobenzene | Orange-yellow |
| 6 | 1-amino-2.5-bis-tri-fluoromethylbenzene | 2-(2'3'-hydroxynaphthoylamino-)naphthalene | Orange |
| 7 | 1-amino-3.5-bis-tri-fluoromethylbenzene | 1-(2'3'-hydroxynaphthoylamino-)2-methylbenzene | Orange-yellow |
| 8 | 1-amino-3.5-bis-tri-fluoromethylbenzene | 2-(2'3'-hydroxynaphthoylamino-)naphthalene | Orange |
| 9 | 1-amino-3.5-bis-tri-fluoromethylbenzene | 1-(2'3'-hydroxynaphthoylamino-)4-methylbenzene | Orange |
| 10 | 1-amino-3.5-bis-tri-fluoromethylbenzene | 1-(2'3'-hydroxynaphthoylamino-)2-methyl-4-methoxybenzene | Orange |
| 11 | 1-amino-3.5-bis-tri-fluoromethylbenzene | 1-(2'3'-hydroxynaphthoylamino-)4-chloro-2.5-dimethoxybenzene | Orange |
| 12 | 1-amino-3.5-bis-tri-fluoromethylbenzene | 1-(2'3'-hydroxynaphthoylamono-)2-ethoxybenzene | Orange |
| 13 | 1-amino-3.5-bis-tri-fluoromethylbenzene | 1-(2'3'-hydroxynaphthoylamino-)4-methoxybenzene | Orange |
| 14 | 1-amino-3.5-bis-tri-fluoromethylbenzene | 1-(2'3'-hydroxynaphthoylamino-) 2-methoxy-4-chlorbenzene | Orange |

Since an object of the present invention is to provide dyestuffs of good fastness properties, which dyestuffs are insoluble in water and alkalies, it is to be understood that the aromatic nuclei of the general formulæ appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

I claim:

1. The water-insoluble azo-dyestuffs of the following general formula:

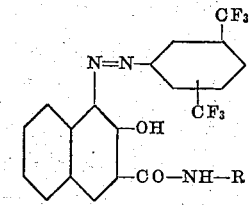

wherein R represents a radical of the benzene or naphthalene series, dyeing, in general, yellowish orange shades and being distinguished by their good fastness properties, particularly by their good fastness to light.

2. The water-insoluble azo-dyestuffs of the following general formula:

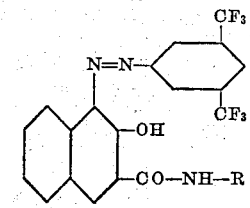

wherein R represents a radical of the benzene or naphthalene series, dyeing, in general, yellowish orange shades and being distinguished by their good fastness properties, particularly by their good fastness to light.

3. The water-insoluble azo-dyestuff of the following formula:

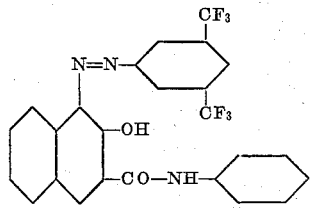

dyeing a vivid yellowish-orange shade and being distinguished by its good fastness properties, particularly by its good fastness to light.

4. The water-insoluble azo-dyestuff of the following formula:

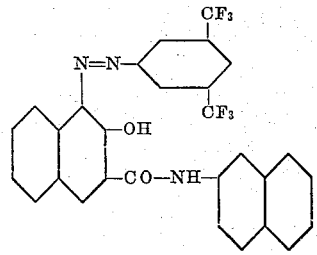

dyeing an orange shade and being distinguished by its good fastness properties, particularly by its good fastness to light.

5. The water-insoluble azo-dyestuff of the following formula:

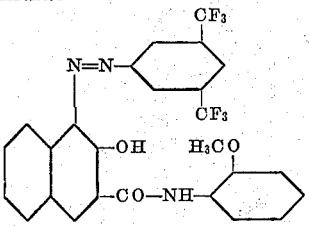

dyeing a vivid orange shade and being distinguished by its good fastness properties, particularly by its good fastness to light.

6. Fiber dyed with the azo-dyestuffs as claimed in claim 1.
7. Fiber dyed with the azo-dyestuffs as claimed in claim 2.
8. Fiber dyed with the azo-dyestuff as claimed in claim 3.
9. Fiber dyed with the azo-dyestuff as claimed in claim 4.
10. Fiber dyed with the azo-dyestuff as claimed in claim 5.

FRITZ MÜLLER.